(12) United States Patent
Taniguchi et al.

(10) Patent No.: US 7,505,755 B2
(45) Date of Patent: Mar. 17, 2009

(54) DATA COMMUNICATION RESTRICTION METHOD, DATA COMMUNICATION RESTRICTION SYSTEM AND MOBILE TERMINAL

(75) Inventors: Hirohito Taniguchi, Settsu (JP); Yoshitoki Asano, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 417 days.

(21) Appl. No.: 11/329,035

(22) Filed: Jan. 11, 2006

(65) Prior Publication Data
US 2006/0171350 A1 Aug. 3, 2006

(30) Foreign Application Priority Data
Jan. 12, 2005 (JP) ............................. 2005-005684

(51) Int. Cl.
*H04M 11/00* (2006.01)
(52) U.S. Cl. .................. 455/405; 455/407; 455/418; 379/121.02; 370/328
(58) Field of Classification Search ................. 455/405, 455/407, 418; 370/328; 379/121.02
See application file for complete search history.

(56) References Cited

U.S. PATENT DOCUMENTS

| 6,188,883 B1 * | 2/2001 | Takemura .................... 455/411 |
| 2001/0023181 A1 | 9/2001 | Savolainen | |
| 2003/0084184 A1 | 5/2003 | Eggleston et al. | |
| 2004/0148273 A1 * | 7/2004 | Allen et al. ...................... 707/2 |
| 2005/0020290 A1 * | 1/2005 | Arata et al. .................. 455/500 |
| 2007/0037600 A1 * | 2/2007 | Fukuda ........................ 455/522 |

FOREIGN PATENT DOCUMENTS

| CH | 1179220 A | 4/1998 |
| EP | 1 032 236 A1 | 8/2000 |
| JP | 2001-78260 | 3/2001 |
| JP | 2001-224073 | 8/2001 |
| JP | 2004-23648 | 1/2004 |
| JP | 02004297247 | * 10/2004 |
| WO | WO 97/22936 | 6/1997 |

* cited by examiner

*Primary Examiner*—Danh C Le
(74) *Attorney, Agent, or Firm*—Oblon, Spivak, McClelland, Maier & Neustadt, P.C.

(57) ABSTRACT

A data communication restriction method for flat rate users is disclosed. The data communication restriction method comprises the steps of: monitoring data communication status of a flat rate user, and determining whether the number of request or communication quantity during a predetermined period exceeded a predetermined threshold (S9); setting the flat rate user as a communication restricted object when it is determined that the threshold was exceeded (S10); and transmitting a communication restriction signal including communication restriction period information to a mobile terminal of the restricted flat rate user, when the restricted flat user requested access again (S11); whereby data communication of the mobile terminal of the restricted flat rate user is restricted during the communication restriction period.

6 Claims, 4 Drawing Sheets

FIG.5

YOUR ACCESS IS RESTRICTED NOW. PLEASE REQUEST ACCESS LATER.

DATA COMMUNICATION RESTRICTION METHOD, DATA COMMUNICATION RESTRICTION SYSTEM AND MOBILE TERMINAL

BACKGROUND OF THE INVENTION

The present invention generally relates to a data communication restriction method, data communication restriction system and mobile terminal.

Recently, the access to the Internet from mobile terminals such as mobile phones is drastically increasing. In order to reduce charges to users for data packet communication, a flat rate service was introduced, in which communication charges are kept constant irrespective of communication quantity. However, users utilizing this service tend to excessively consume a lot of data communication resource, which is a problem.

The flat rate service contracts between users and providers allows the providers to limit or restrict data communication of excessively using flat rate users in order to prevent them from exclusively using of data communication resource. On the other hand, providers are obliged to guarantee communication quality to usage based rate users. Therefore, it is needed to introduce communication restriction systems for guaranteeing communication quality to usage based rate users even at the sacrifice of flat rate users' communication.

This communication restriction should be placed on data communication only but not on voice communication. Accordingly, communication restricted users can utilize voice communication as usual.

FIG. 1 is a conception view for illustrating conventional communication restriction system. In normal operation, a mobile terminal 101 gets access to an external network like the Internet, via an exchange 102 and a relay base station 103. When the relay base station 103 detected excessive accesses from the mobile terminal 101, the relay base station 103 does not relay further access request from the mobile terminal 101 via the exchange 102 to the relay base station 103 any longer.

Many kinds of communication restriction methods for dealing with communication congestion are known. One of them is disclosed in Japanese Patent Laid-open No. 2001-78260. In the communication restriction system disclosed in this document, a base station always monitors communication congestion condition in its radio area, and calculates a congestion level and notifies mobile terminals of the congestion level information. The mobile terminals control their access requests in accordance with the informed congestion level information.

In the communication restriction system shown in FIG. 1, it is possible to prevent from exclusively using communication resource after the relay base station 103. However, since all access requests (re-try requests due to access restriction) repeatedly generated by the mobile terminal 1 pass through the exchange 102, the load of the exchange 102 cannot be reduced.

On the other hand, in the communication restriction system disclosed in Japanese Patent Laid-open No. 2001-78260, communication restriction is placed on many users in accordance with congestion condition in their radio area. It is impossible to restrict only excessively using users among flat rate users. Further, this communication restriction is not only applied to data packet communication but also applied to all communications.

SUMMARY OF THE INVENTION

An object of the present invention is to provide a data communication restriction system and method in which communication restriction is applied only to data communication such as packet communication of specific users and the communication restriction cannot be released by mobile terminals.

The above object of the present invention is achieved by a data communication restriction method for flat rate users, comprising the steps of: monitoring data communication status of a flat rate user, and determining whether the number of request or communication quantity during a predetermined period exceeded a predetermined threshold; setting the flat rate user as a communication restricted object when it is determined that the threshold was exceeded; and transmitting a communication restriction signal including communication restriction period information to a mobile terminal of the restricted flat rate user, when the restricted flat user requested access again; whereby data communication of the mobile terminal of the restricted flat rate user is restricted during the communication restriction period.

In the data communication restriction method for flat rate users, the threshold and the communication restriction period may be determined for each base station.

In the data communication restriction method for flat rate users, the communication restriction signal may be transmitted by a short message service.

The data communication restriction method for flat rate users, may further comprise the step of: transmitting a de-restriction signal to the mobile terminal of the restricted flat rate user when a general de-restriction is desired, whereby data communication of the mobile terminal of the restricted flat rate user can be normally operated.

In the data communication restriction method for flat rate users, the communication de-restriction signal may be transmitted by a short message service.

The object of the present invention is achieved by a data communication restriction system, comprising: means for monitoring data communication status of a flat rate user, and determining whether the number of request or communication quantity during a predetermined period exceeded a predetermined threshold; means for setting the flat rate user as a communication restricted object when it is determined that the threshold was exceeded; and means for transmitting a communication restriction signal including communication restriction period information to a mobile terminal of the restricted flat rate user, when the restricted flat user requested access again; whereby data communication of the mobile terminal of the restricted flat rate user is restricted during the communication restriction period.

The object of the present invention is achieved by a mobile terminal comprising: means for receiving a communication restriction signal including communication restriction period information from a base station; and means for inhibiting data communication during the communication restriction period when having received the communication restriction signal.

The mobile terminal may further comprise: means for showing on a screen that data communication is restricted, when having received the communication restriction signal.

The mobile terminal may further comprise: means for restoring the data communication to normal operation status, when having received a communication de-restriction signal.

According to an embodiment of the present invention, it is possible to realize a data communication restriction system and method in which communication restriction is applied only to data communication such as packet communication of specific users and the communication restriction cannot be released by mobile terminals.

BRIEF DESCRIPTION OF THE DRAWINGS

FIG. 5 shows a screen of a mobile terminal according to the embodiment of the present invention.

DESCRIPTION OF THE PREFERRED EMBODIMENTS

Figure 1:
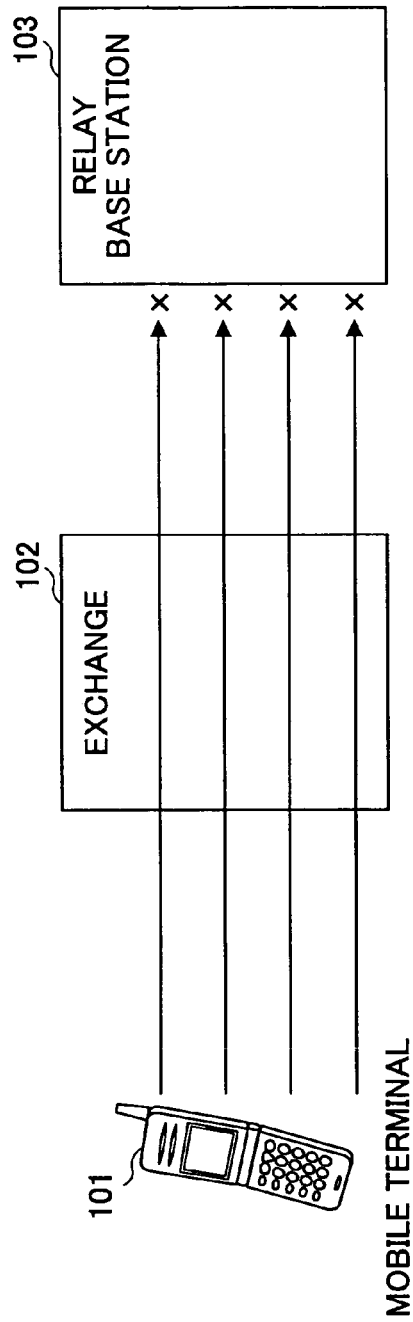
FIG. 1 is a conception view of a conventional communication restriction.

The following is a description of embodiments of the present invention, with reference to the accompanying drawings.

Throughout all the figures, members and parts having the same or similar functions are assigned the same or similar reference numerals or symbols, and redundant explanations are omitted.

Figure 2:
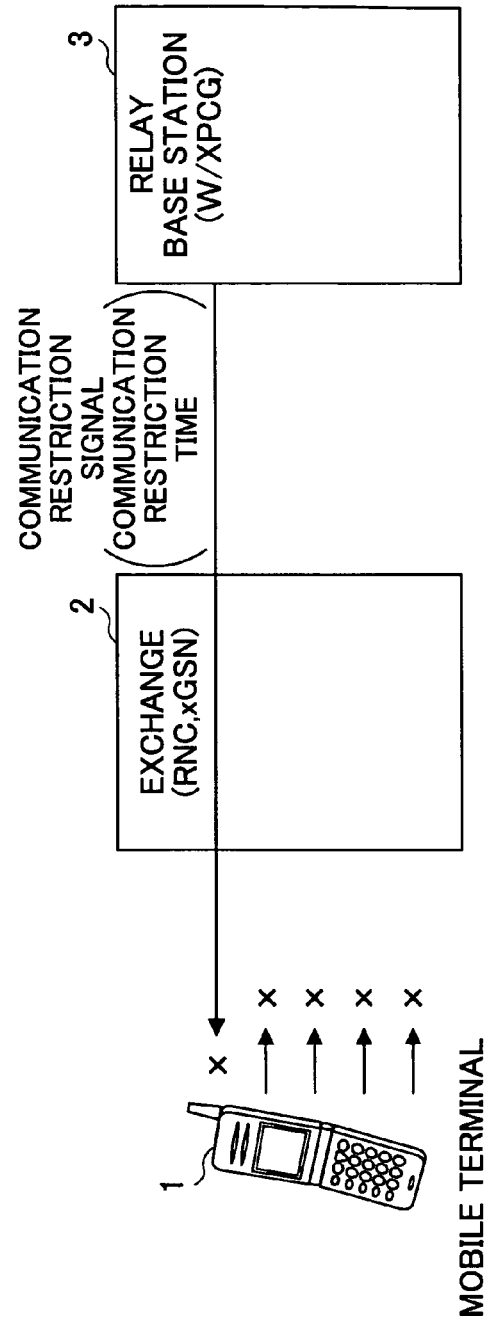
FIG. 2 is a conception view of a communication restriction according to an embodiment of the present invention.

FIG. 2 is a conception view for illustrating communication restriction scheme according to an embodiment of the present invention. In FIG. 2, a mobile terminal 1 such as a mobile phone owned by a flat rate user can normally request access to an external network like the Internet via an exchange 2 and a relay base station 3. When the relay base station 3 detects excessive access from the flat rate user mobile terminal 1, the relay base station 3 sets the flat rate user as a communication restricted object. If the flat rate user requests access to the external network again, the relay base station responds to the re-access and transmits a communication restriction signal including communication restriction period information to the flat rate user mobile terminal 1 via the exchange 2. Therefore, the mobile terminal is restricted or inhibited from getting access to the external network during the designated communication restriction period. As a result, no access request is generated from the flat rate user mobile terminal 1 to the exchange 2 during the designated communication restriction period, and therefore the load of the exchange 2 can be effectively reduced.

Figure 3:
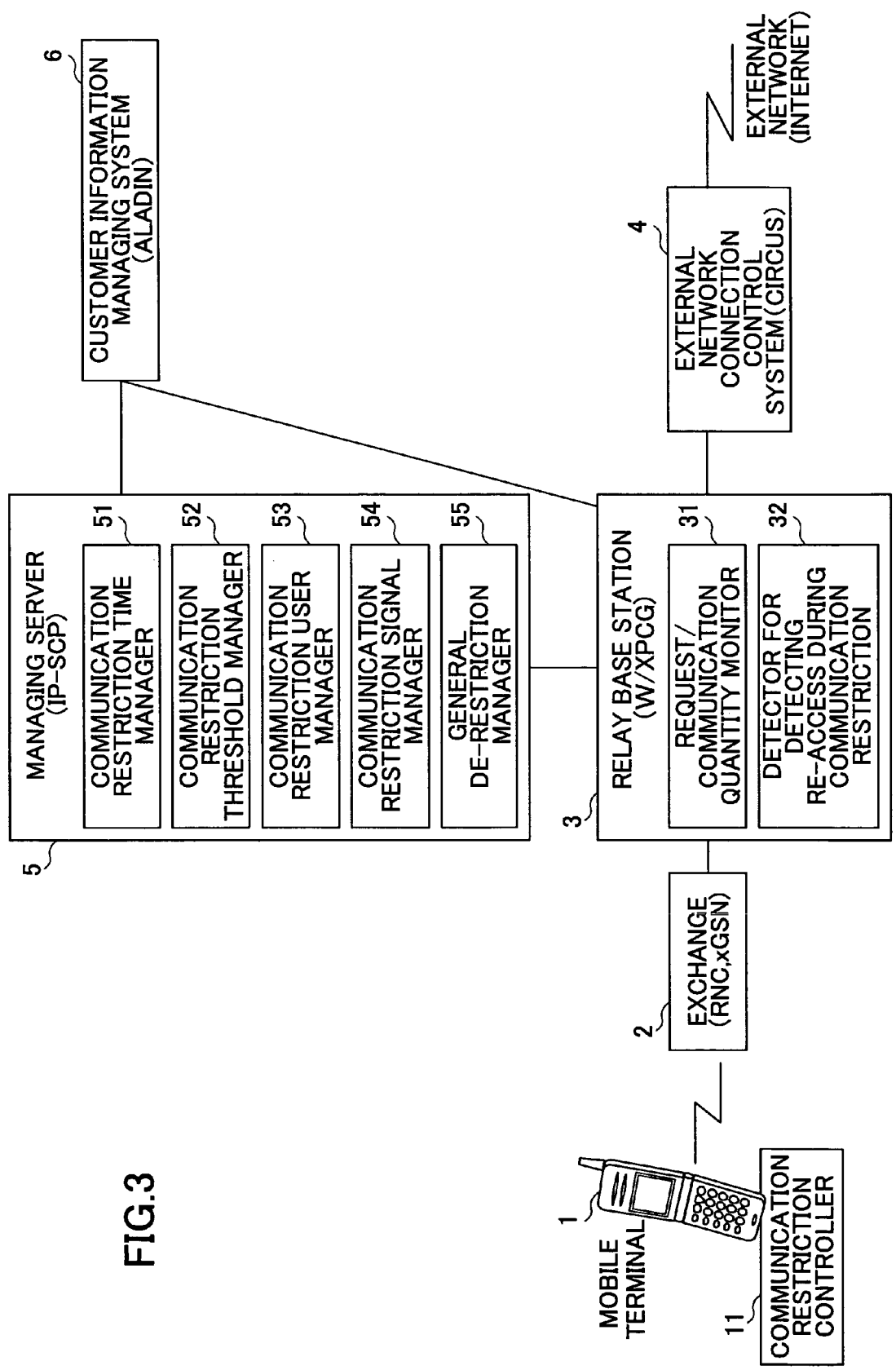
FIG. 3 is a block diagram of a communication restriction system according to the embodiment of the present invention.

FIG. 3 is a block diagram of a communication restriction system according to an embodiment of the present invention. The communication restriction system comprises a mobile terminal 1, an exchange 2, a relay base station 3, an external network connection control system 4, a managing server 5 and a customer information managing system 6.

The mobile terminal 1 has a communicating function of performing normal voice communication and data communication, and a communication restriction controller 11. When it receives a communication restriction signal including communication restriction period information from the relay base station 3 via the exchange 2, the communication restriction controller 11 restricts or inhibits the mobile terminal 1 from performing data communication during a designated communication restriction period, and displays notice that data communication is under restriction on a screen. The function of the communication restriction controller 11 can be realized by software (computer program).

The exchange 2 may be an RNC (Radio Network Controller), xGSN (GPRS Support Node, GPRS: General Packet Radio Service), or the like. The relay base station 3 may be W/XPCG (Wireless/eXtended wireless Protocol Conversion Gateway), or the like. The external network connection control system 4 may be CiRCUS (treasure Casket of i-mode® service, high Reliability platform for CUStomer) commonly known as the i-mode center, or the like. The managing server 5 may be IP-SCP (IP-based Service Control Point), or the like. The customer information managing system 6 may be ALADIN (ALl Around DoCoMo INformation system), or the like.

The relay base station 3 has a normal relaying function and further has a request/communication quantity monitor 31 and a detector for detecting re-access during communication restriction. The request/communication quantity monitor 31 monitors data communication status of a flat rate user and determines whether the number of access request or the quantity of data communication during a predetermined period exceeds a predetermined threshold. When it exceeds the threshold, the request/communication quantity monitor 31 transmits a notice to the managing server 5. The detector for detecting re-access during communication restriction 32 detects that re-access was requested by the flat user that has been set as a communication restricted object and transmits a notice to the managing server 5.

The managing server 5 comprises a communication restriction time manager 51, a communication restriction threshold manager 52, a communication restriction user manager 53, a communication restriction signal manager 54, and a general de-restriction manager 55. The communication restriction time manager 51 individually manages and determines a communication restriction period for an area where the relay base station 3 exists, in accordance with congestion condition of data communication in the area. The communication restriction threshold manager 52 individually manages and determines a threshold which is used for determining whether the number of request or the communication quantity of the restricted flat rate user exceeds, in accordance with congestion condition of data communication in the area where the relay base station 3 exists. The communication restriction user manager 53 sets the flat rate user as a communication restricted object when it is determined that its number of request or communication quantity exceeds the predetermined threshold, and restricts the data communication of the flat rate user through the relay base station 3. The communication restriction signal manager 54 transmits a communication restriction signal including communication restriction period information to the mobile terminal 1 of the flat rate user, when the flat rate user set as a communication restricted object requests access again. The general de-restriction manager 55 generally releases the restriction or de-restricts for all mobile terminals and transmits a communication de-restriction signal to the mobile terminal 1 of the restricted flat rate user, for example when a disaster occurred.

Figure 4:
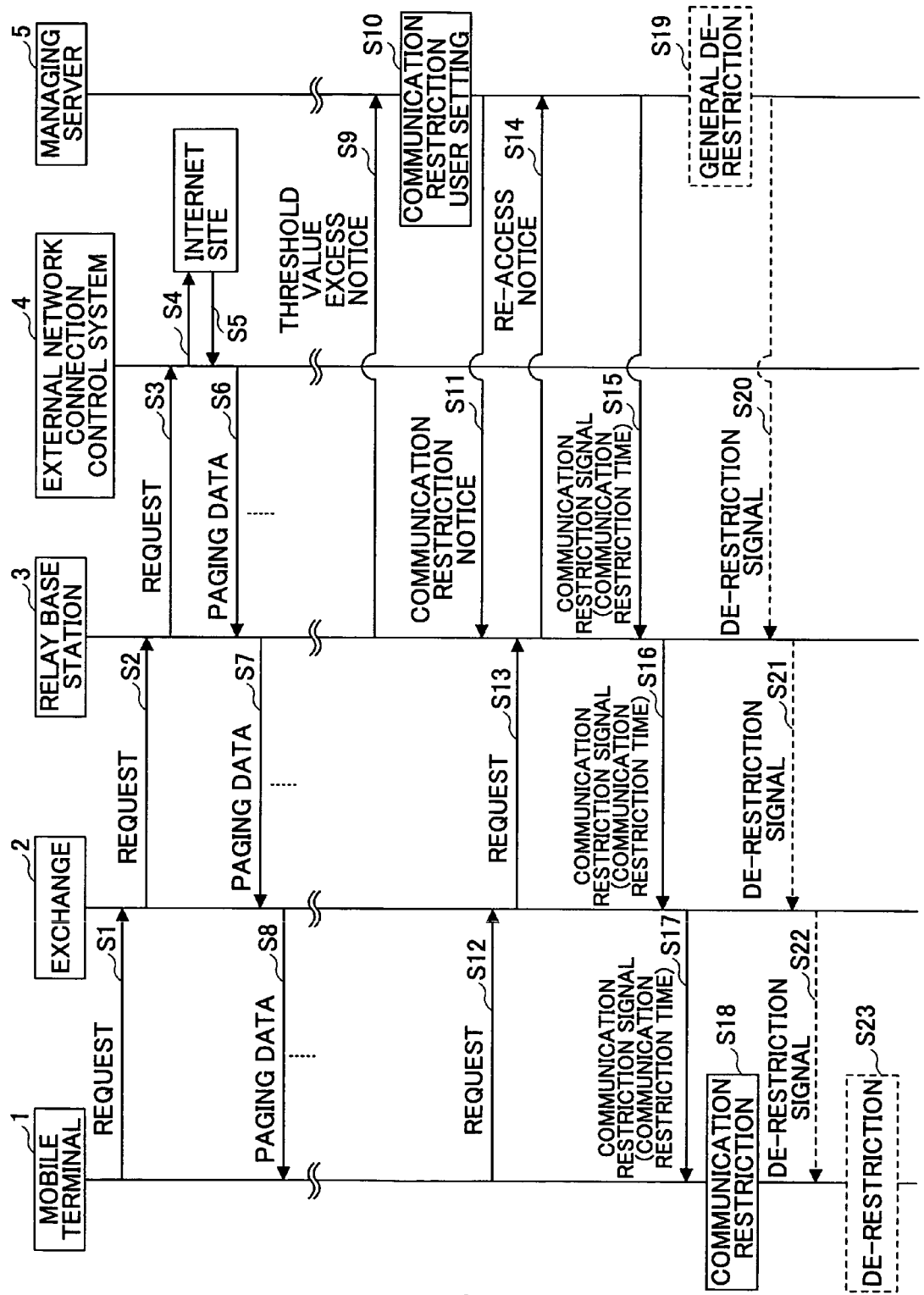
FIG. 4 is a sequence chart illustrating operation of the communication restriction system shown in FIG. 3.

FIG. 4 is a sequence chart illustrating operation of the above-explained embodiment of the present invention.

First, in normal operation, the mobile terminal 1 held by the flat rate user sends a request (steps S1~S8) to an external network such as the Internet via the exchange 2, the relay base station 3 and the external network connection control 4.

The request/communication quantity monitor 31 of the relay base station 3 monitors communication status of the mobile terminal 1 of the flat rate user. It is possible to know whether the user of the mobile terminal 1 is a flat rate user, by acquiring contract information indirectly from the customer information managing system 6 via the managing server 5 or directly from the customer information managing system 6.

The threshold for determining the excess of the number of request or the communication quantity is previously notified by the managing server 5.

When the number of request or the communication quantity of the mobile terminal 1 of the flat rate user during the predetermined period exceeds the predetermined threshold, the request/communication quantity monitor of the relay base station 3 notifies the excess to the managing server 5 (step S9).

When the managing server 5 receives the notice of the excess of the number of request or the communication quantity of the specific flat rate user from the relay base station 3, it sets the flat rate user as a communication restricted object (step S10), and transmits a notice to the relay base station 3 that the communication of the flat rate user should be restricted (step S11). Then the relay base station 3 does not relay data communication from the mobile terminal 1 until the communication restriction for the flat rate user is released.

Next, if the mobile terminal 1 of the flat rate user that is a communication restricted object sent a request again to the relay base station 3 via the exchange 2 (step S12, S13), the detector for detecting re-access during communication restriction 32 of the relay base station 3 detects the re-access and notifies the re-access to the managing server 5 (step S14).

The managing server 5 receives the notice of the re-access, and the communication restriction signal manager 54 transmits a communication restriction signal to the mobile terminal 1 of the flat rate user that is a communication restriction object, by using the function of SMS (Short Message Service) for example (step S15~S17). The communication restriction signal includes communication restriction period information managed by the communication restriction time manager 51.

The mobile terminal 1 receives the communication restriction signal, and the communication restriction controller 11 inhibits data communication during the communication restriction period (step S18). The communication restriction controller 11 displays on a screen a message like "Your access is restricted now. Please request access later" as shown in FIG. 5. The communication restriction period is set by the managing server 5 in accordance with the congestion condition of data communication in the area where the relay base station 3 lies. For example, the communication restriction period is determined to be longer in a downtown area that many users belong to. A threshold for determining the excess of the number of request and the communication quantity is determined to be lower in such a downtown area.

During the communication restriction period, the mobile terminal 1 cannot access to the external network. Even if the restricted user forcibly releases the communication restriction by resetting the program, the user still cannot access to the network because the relay base station 3 does not relay the user's request for access.

When the communication restriction period is over or completed, the communication restriction controller 11 of the mobile terminal 1 restores the data communication function to the normal operation state.

On the other hand, in case where data communication should be generally allowed when a disaster occurred for example, the general de-restriction manager of the managing server 5 generally releases all the communication restriction (step S19). The managing server 5 deletes the communication restricted objects in the communication restriction user manager 53, and transmits a de-restriction signal (step S20~S22) to the mobile terminal 1 of the flat rate user via the relay base station by the SMS function.

The relay base station 3 receives the de-restriction signal and releases the communication restriction from the flat rate user. The mobile terminal 1 also receives the de-restriction signal and the communication restriction controller 11 restores the data communication to the normal operation (step S23). Therefore, the mobile terminal 1 can access to the external network via the exchange 2, the relay base station 3 and the external network connection control system 4.

According to the embodiment of the present invention, it is possible to individually place data communication restriction on a flat rate user who utilized a large amount of data packet communication. The communication restriction can be so strict that the mobile terminal 1 cannot avoid. Further the restriction can be released if desired, when disaster occurred, for example.

The present application is based on Japanese Priority Application No. 2005-005684 filed on Jan. 12, 2005 with the Japanese Patent Office, the entire contents of which are hereby incorporated by reference.

What is claimed is:

1. A data communication restriction method for flat rate users, comprising the steps of:
    monitoring data communication status of a flat rate user, and determining whether the number of request or communication quantity during a predetermined period exceeded a predetermined threshold;
    setting the flat rate user as a communication restricted object when it is determined that the threshold was exceeded; and
    transmitting a communication restriction signal including communication restriction period information to a mobile terminal of the restricted flat rate user, when the restricted flat user requested access again;
    whereby data communication of the mobile terminal of the restricted flat rate user is restricted during the communication restriction period.

2. The data communication restriction method for flat rate users as claimed in claim 1, wherein
    the threshold and the communication restriction period are determined for each base station.

3. The data communication restriction method for flat rate users as claimed in claim 1, wherein
    the communication restriction signal is transmitted by a short message service.

4. The data communication restriction method for flat rate users as claimed in claim 1, further comprising the step of:
    transmitting a de-restriction signal to the mobile terminal of the restricted flat rate user
    when a general de-restriction is desired,
    whereby data communication of the mobile terminal of the restricted flat rate user can be normally operated.

5. The data communication restriction method for flat rate users as claimed in claim 4, wherein
    the communication de-restriction signal is transmitted by a short message service.

6. A data communication restriction system, comprising:
    means for monitoring data communication status of a flat rate user, and determining whether the number of request or communication quantity during a predetermined period exceeded a predetermined threshold;
    means for setting the flat rate user as a communication restricted object when it is determined that the threshold was exceeded; and
    means for transmitting a communication restriction signal including communication restriction period information to a mobile terminal of the restricted flat rate user, when the restricted flat user requested access again;
    whereby data communication of the mobile terminal of the restricted flat rate user is restricted during the communication restriction period.

* * * * *